(12) United States Patent
Cox et al.

(10) Patent No.: US 6,720,967 B1
(45) Date of Patent: Apr. 13, 2004

(54) METHOD AND APPARATUS FOR DISPLAYING WORK FLOW INFORMATION

(75) Inventors: Kenneth Charles Cox, Naperville, IL (US); Lichan Hong, Naperville, IL (US); Vladimir Nepustil, Boulder, CO (US); Paul L Richman, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/516,088

(22) Filed: Mar. 1, 2000

(51) Int. Cl.7 .................................................. G06F 3/14
(52) U.S. Cl. ........................ 345/440; 345/734; 345/736; 345/835
(58) Field of Search ................................. 345/440, 839, 345/764, 835, 965, 970, 734, 736, 737, 854

(56) References Cited

U.S. PATENT DOCUMENTS

| | | | |
|---|---|---|---|
| 4,800,510 A | 1/1989 | Vinberg et al. ............. 364/521 |
| 5,510,809 A | 4/1996 | Sakai et al. ................. 345/140 |
| 5,890,130 A * | 3/1999 | Cox et al. ....................... 705/7 |
| 5,999,193 A | 12/1999 | Conley, Jr. et al. .......... 345/440 |
| 6,222,540 B1 | 4/2001 | Sacerdoti ..................... 345/339 |
| 6,225,998 B1 * | 5/2001 | Okita et al. .................. 345/853 |
| 6,407,751 B1 * | 6/2002 | Minami et al. .............. 345/736 |
| 2002/0046072 A1 * | 4/2002 | Arai et al. ...................... 705/8 |

* cited by examiner

Primary Examiner—Raymond J. Bayerl
Assistant Examiner—Thomas T. Nguyen
(74) Attorney, Agent, or Firm—Sheridan Ross P.C.

(57) ABSTRACT

A workflow display system in accordance with the principles of the present invention includes an output device, such as a cathode ray tube (CRT), liquid crystal display (LCD), or other display device and a display controller. The display controller and display operate in concert to display graphical images that are representative of workflow information. Textual information may also be displayed. Such a display may employ the size, color, and number of glyphs to represent the number of work units in one or more work states. Other display characteristics, such as patterns, flashing, or other such visual queues may also be employed to convey information about workflow in a manner which is readily comprehensible. For example, in a telephone contact and fulfillment center application, the size and/or number of circles may indicate the number of waiting calls in a given state.

18 Claims, 7 Drawing Sheets

METHOD AND APPARATUS FOR DISPLAYING WORK FLOW INFORMATION

FIELD OF THE INVENTION

The invention relates to display systems and, more particularly, to interactive displays for the presentation and analysis of data.

BACKGROUND OF THE INVENTION

Workflow analysis is often employed to assist in the management of workflow through a work center. In a call distribution center, for example, data related to the number and duration of calls an agent handles is typically compiled and analyzed. A supervisor may query a database in order to further analyze this workflow information and to adjust workloads among a group of agents. One or more agents within the call center may be particularly efficient, or may be working on a type of call that typically requires less effort and, consequently, may be able to handle more calls, while other, possibly less efficient agents, are unable to handle their assigned workload. This disparity may not be apparent to the manager who determines the number and type of calls to be directed to individual agents within the call center. Upon querying a workflow database a supervisor may be able to determine these variations in workflow demand and, consequently, may be able to adjust work assignments to improve the overall efficiency of the call center. However, analysis of a printout or textual display of workflow statistics may require a certain level of sophistication on the part of the supervisor. And, even assuming that the supervisor possesses this analytical sophistication, the analysis of the workflow information may be so time-consuming as to prohibit real-time adjustment of workflow.

Although daily or weekly analysis of workflow information may be a valuable management tool, more frequent analysis may provide for increased efficiencies. However, current presentation methods may impede a manager's absorption of workflow information. That is, lists or spreadsheets filled with the numerical, textual, representations of workflow data may not be readily comprehensible. Without effective representation of workflow data and analysis results, the efforts expended in compiling and analyzing workflow data may be much less effective than desired. In addition to the call distribution functions, workflow functions might also include "back office" tasks, such as billing, loan approval, and other similar functions. A center which processes calls and performs such back office tasks will be referred to hereinafter as a contact and fulfillment center.

An apparatus and method that provide readily comprehensible representations of workflow data and workflow data analysis would therefore be highly desirable. The provision of readily comprehensible workflow representations in accordance with the principles of the present invention are not restricted to any one type of workflow and may be applied to workflow of the "back office" tasks associated with a contact and fulfillment center, to the workflow of call processing in the call center segment of a contact and fulfillment center, or to any other type of workflow.

SUMMARY

A workflow display system in accordance with the principles of the present invention includes an output device, such as a cathode ray tube (CRT), liquid crystal display (LCD), or other display device and a display controller. The display controller and display device operate in concert to display graphical, diagramatic, images that are representative of workflow information. Textual information may also be displayed. Such a display may employ, static and mobile elements, such as glyphs, to represent different aspects of workflow, and the size, color, and number of glyphs to represent the number of work units in one or more work states. Other display characteristics, such as patterns, flashing, or other such visual queues may also be employed to convey information about workflow in a manner which is readily comprehensible. For example, in a telephone call center application, the size and/or number of circular glyphs may indicate the number of waiting calls in a given state, such as "in queue".

In one aspect of the invention, the display system may display a flowchart that is analogous to the flow of work through a subject system. Such an analogous flowchart may take the form of symbols which represent different locations within a call center, such as an incoming queue, or one or more agent's stations, for example. Some elements of such a flowchart display may remain static, such as a "telephone" icon which may represent an agent's station, while other elements of such a display, such as a glyph that represents an individual call, may move about the display to indicate the progress of a call from one area of the call center to another.

The display system may be interactive, allowing a user to change the level of detail in a given display segment or displayed state, for example. Additionally, the display may be employed in graphical programming, whereby a graphical element represents a software element and the addition, deletion, or reconfiguring of a graphical element on the display is reflected in the represented program.

The provision of readily comprehensible workflow representations in accordance with the principles of the present invention are not restricted to any one type of workflow and may be applied to workflow of the "back office" tasks associated with a contact and fulfillment center, to the workflow of call processing in the call center segment of a contact and fulfillment center, or to any other type of workflow.

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

A workflow display system in accordance with the principles of the present invention includes a display, such as a cathode ray tube (CRT), for example, and a display controller. The display controller and display operate in concert to display graphical images that are representative of workflow information. Textual information may also be displayed. Such a display may employ the size, color, and number of glyphs to represent the number of work units in one or more work states. Other display characteristics, such as patterns, flashing, or other such visual cues may also be employed to convey information about workflow in a manner which is readily comprehensible.

Figure 1:
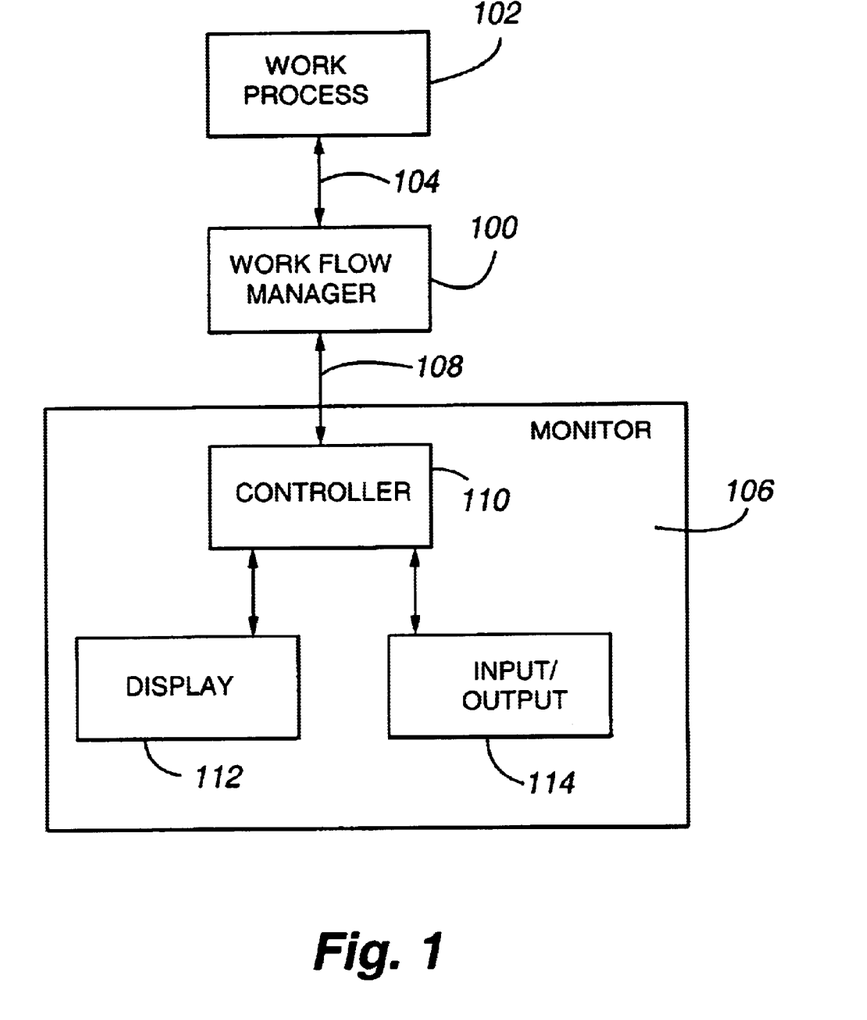
FIG. 1 is a conceptual block diagram of a workflow system that includes a workflow monitoring system in accordance with the principles of the present invention.

A workflow system such as that illustrated in the conceptual block diagram of FIG. 1 includes a workflow management system 100 (which may also be referred to hereinafter as a workflow manager) that communicates with a work process 102. The workflow manager 100 is an automated system, which may include a general-purpose computer and/or a combination of hardware and software developed specifically for the work process 102. The work process 102 may take any one of many forms, such as the distribution of calls in a call distribution system, for example, and, for the sake of brevity and clarity of explanation, the invention will be discussed hereinafter in the context of a call-distribution application. The provision of readily comprehensible workflow representations in accordance with the principles of the present invention are not restricted to any one type of workflow. That is, apparatus and methods may be applied to workflow of the "back office" tasks associated with a contact and fulfillment center, to the workflow of call processing in the call center segment of a contact and fulfillment center, or to any other type of workflow. Such other types of workflow susceptible to representation in accordance with the principles of the present invention may include, for example, a loan application awaiting approval in a loan officer's queue or, once processed by the loan officer, the application approval (or rejection), which may be in a loan response output queue while pending the typing and mailing of an application response. In short, any type of workflow: call processing, back office tasks within a contact and fulfillment center, or other type of workflow, may benefit from representation in accordance with the principles of the present invention.

Communications between the work process 102 and work manager 100 take place over a communications link 104. The communications link 104 may take the form of a high-speed local area network (LAN) connection, a standard computer bus interface, or other communications means. Management information exchanged between the manager 100 and the work process 102 may include information sent from the work process 102, such as the number of telephone calls waiting in a particular queue or whether individual agents are currently occupied. Information sent from the manager 100 to the work process 102 may include control signals that switch telephone calls from one, overloaded, incoming queue to another queue, for example.

The workflow manager 100 also communicates with a workflow monitoring system 106 through a communications link 108, which, like the link 104, may take the form of a LAN connection, a standard interface bus, or other communications means. The workflow monitoring system 106 includes a controller 110 which, in this illustrative embodiment, communicates with the workflow manager 100 through the link 108.

Figure 2:
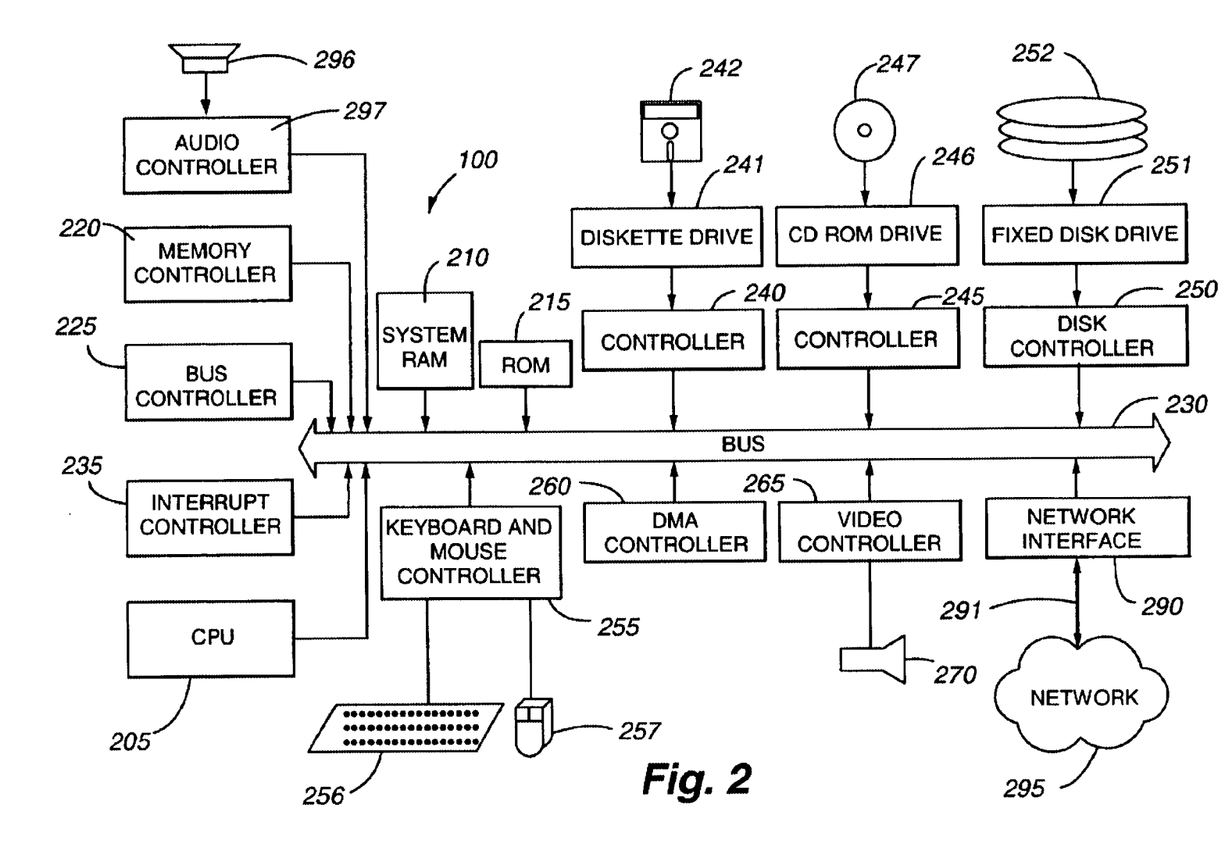
FIG. 2 is a conceptual block diagram of a computer system that may be used to display workflow information in accordance with the principles of the present invention.

FIG. 2 illustrates the system architecture for a computer system 200 on which the invention may be implemented. The exemplary computer system of FIG. 2 is for descriptive purposes only. Although the description may refer to terms commonly used in describing particular computer systems, the description and concepts equally apply to other systems, including systems having architectures dissimilar to FIG. 2.

Computer system 200 includes a central processing unit (CPU) 205, which may be implemented with a conventional microprocessor, a random access memory (RAM) 210 for temporary storage of information, and a read only memory (ROM) 215 for permanent storage of information. A memory controller 220 is provided for controlling RAM 210.

A bus 230 interconnects the components of computer system 200. A bus controller 225 is provided for controlling bus 230. An interrupt controller 235 is used for receiving and processing various interrupt signals from the system components.

Mass storage may be provided by diskette 242, CD ROM 247, or hard drive 252. Data and software may be exchanged with computer system 200 via removable media such as diskette 242 and CD ROM 247. Diskette 242 is insertable into diskette drive 241 which is, in turn, connected to bus 230 by a controller 240. Similarly, CD ROM 247 is insertable into CD ROM drive 246 which is, in turn, connected to bus 230 by controller 245. Hard disc 252 is part of a fixed disc drive 251 which is connected to bus 230 by controller 250.

User input to computer system 200 may be provided by a number of devices. For example, a keyboard 256 and mouse 257 are connected to bus 230 by controller 255. An audio transducer 296, which may act as both a microphone and a speaker, is connected to bus 230 by audio controller 297, as illustrated. It will be obvious to those reasonably skilled in the art that other input devices, such as a pen and/or tabloid may be connected to bus 230 and an appropriate controller and software, as required. DMA controller 260 is provided for performing direct memory access to RAM 210. A visual display is generated by video controller 265 which controls video display 270. Computer system 200 also includes a communications adaptor 290 which allows the system to be interconnected to a local area network (LAN) or a wide area network (WAN), schematically illustrated by bus 291 and network 295. An input interface 299 operates in conjunction with an input device 293 to permit a user to send information, whether command and control, data, or other types of information, to the system 200. The input device and interface may be any of a number of common interface devices, such as a joystick, a touch-pad, a touch-screen, a speech-recognition device, or other known input device.

Operation of computer system 200 is generally controlled and coordinated by operating system software. The operating system controls allocation of system resources and performs tasks such as processing scheduling, memory management, networking, and I/O services, among things. In particular, an operating system resident in system memory and running on CPU 205 coordinates the operation of the other elements of computer system 200. The present invention may be implemented with any number of operating systems, including commercially available operating systems. One or more applications, such may also run on the CPU 205. If the operating system is a true multitasking operating system, multiple applications may execute simultaneously.

Figure 3:
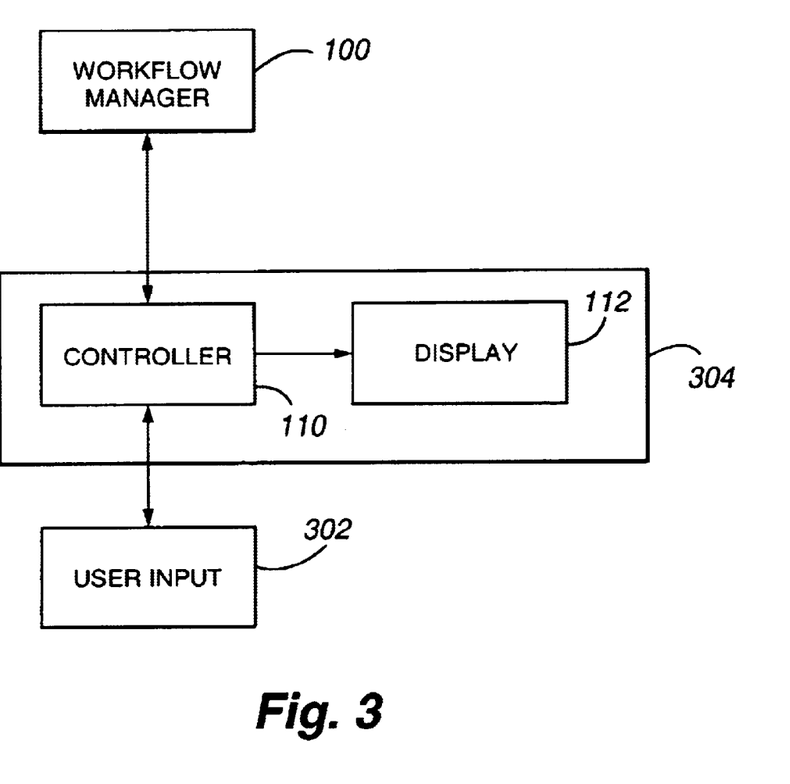
FIG. 3 is a conceptual block diagram of workflow monitoring system in accordance with the principles of the present invention.

FIG. 3 illustrates conceptually the main components of a system in accordance with the present invention. A user input 302 may take the form of a known user input device and device interface, such as keyboard and mouse (with corresponding controllers), a joystick, touch pad, touch screen, voice input device, etc. The new interactive display engine 304 may include various of the hardware components described in the discussion related to FIG. 2, including a display 112 and controller 110. The display engine accepts input from the user input 302 and from the workflow manager 100. In response to input from either the user input 302 or workflow manager 100 the controller 110 produces output for the display 112. As will be discussed in greater detail below, the software elements of the system may be implemented using object-oriented programming techniques.

As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise, objects are destroyed by a special function called a destructor. Objects may be used by using their data and invoking their functions. When an object is created at runtime memory is allotted and data structures are created.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the attributes and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs. In accordance with the principles of the present invention, OOP, or other programming techniques may be employed to implement the workflow representation functions discussed below.

In accordance with the principles of the present invention, the display 112 may be employed to display workflow information related to various workflow states. In the illustrative embodiment of FIG. 4 the display 112 provides a diagramatic view 400 of call flow in a call distribution center. The view 400 includes "stationary" or "static" elements that operate as analogues of workflow stations and which provide a readily comprehensible view of workflow states. In this illustrative view, in which the workflow process being monitored and displayed is that of a call distribution center, the static elements include a first message 402 (also labeled "Message 1), which is the first message directed to an incoming caller as a call is received at the call center. Other static elements are arranged to indicate the general flow of calls into the center. For example, the element 406 (also labeled DTMF=1) is a state in which the call center awaits a dual tone multi-frequency (DTMF) response from a caller.

Figure 4:
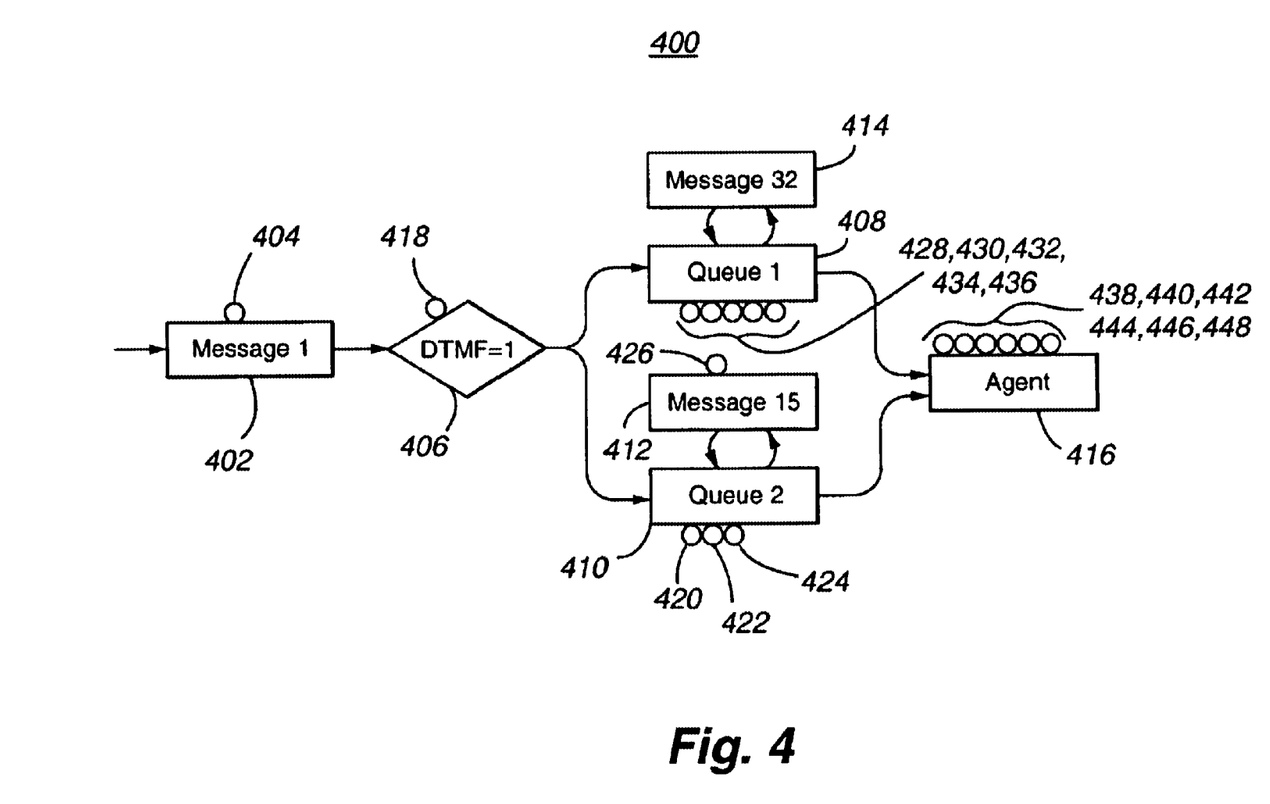
FIG. 4 is a conceptual diagram illustrating the display of workflow information in accordance with the principles of the present invention.

Depending upon the caller's response, that is, the caller's DTMF input, the call may be switched to an incoming call queue, represented by element 408 (also labeled Queue 1), or to a second incoming call queue, represented by element 410 (also labeled Queue 2). The incoming call queues represented by elements 408 and 410 have respectively associated elements 414 (also labeled Message 32) and 412 (also labeled Message 15). The associated elements 412 and 414 represent recorded messages that are periodically sent to incoming calls awaiting in the incoming queues. The static element 416 (also labeled Agent) of this illustrative embodiment is representative of an agent who receives and handles calls from either queue 1 or queue 2.

Although these elements are referred to as static, they may be modified, added to, or deleted, and a user may interact with a static element to "drill down" in order to obtain more detailed information regarding the workflow state represented by the particular static element. Static elements are referred to as static in order to distinguish them from mobile elements such as the glyphs 404 which represent incoming calls and which move from one static element to another to indicate the progress of calls through the call center that is represented by the view 400. In this illustrative embodiment, for example, the single glyph 404 associated with the Message 1 static element 402 indicates that a single call is currently receiving the incoming call message, or is in the incoming message state, represented by the Message 1 static element 402. Similarly the glyph 418 indicates that a call is in the state represented by static element 406 wherein the call system is awaiting a DTMF input from the caller associated with the call represented by the glyph 418. Three circular glyphs 420, 422, and 424 located adjacent to static element 410 indicate that three telephone calls await servicing in the queue represented by the static element 410. A single glyph 426 indicates that a call in the queue represented by the static element 410 is receiving a message labeled message 15 while the caller is waiting to be serviced. Similarly, single glyphs 428 through 436 indicate that five callers are awaiting servicing in the queue represented by the static element 408. The six glyphs 438 through 448 associated with the static element 416 indicate that six telephone calls are being serviced by one or more agents represented by the static element 416.

The illustrative embodiment of FIG. 4 includes static elements that are combined to create workflow display that is analogous to a flowchart, with mobile elements, such as the glyph 404 moving among the static elements as a call progresses through the call center. Textual information may be included in the display, such as the "Agent", "Queue 1" and "Queue 2" labels, but the display does not depend upon textual information to provide an immediate vision of the progress of workflow within the call center. That is, unlike a printout, or display list, such as:

| Queue 1 | 6 |
| Queue 2 | 4 |
| . | |
| . | |
| . | | an observer can make an immediate judgement regarding the relative loading of different elements within the call center and of the overall loading of the call center as well. Additional information may be presented for immediate recognition through the use of different patterns, different colors, "flashing" glyphs, and other techniques. Additional information related to either the mobile elements or static elements may be obtained, for example, by a "drilling down" process in which additional information is displayed in a manner analogous to a pulldown menu. The view of FIG. 4 is particularly suited to the display of call flow and call routing, in that it displays all possible logical paths over which a call may be routed within the call center. In this illustrative call center embodiment, the displayed information may be extracted from vector programs typically resident in call center switches, and which may be located in the workflow manager 100. In addition to providing immediate workflow status information, a visual interface such as this may be employed in programming call center vectors and in analyzing call center treatments.

Figure 5:
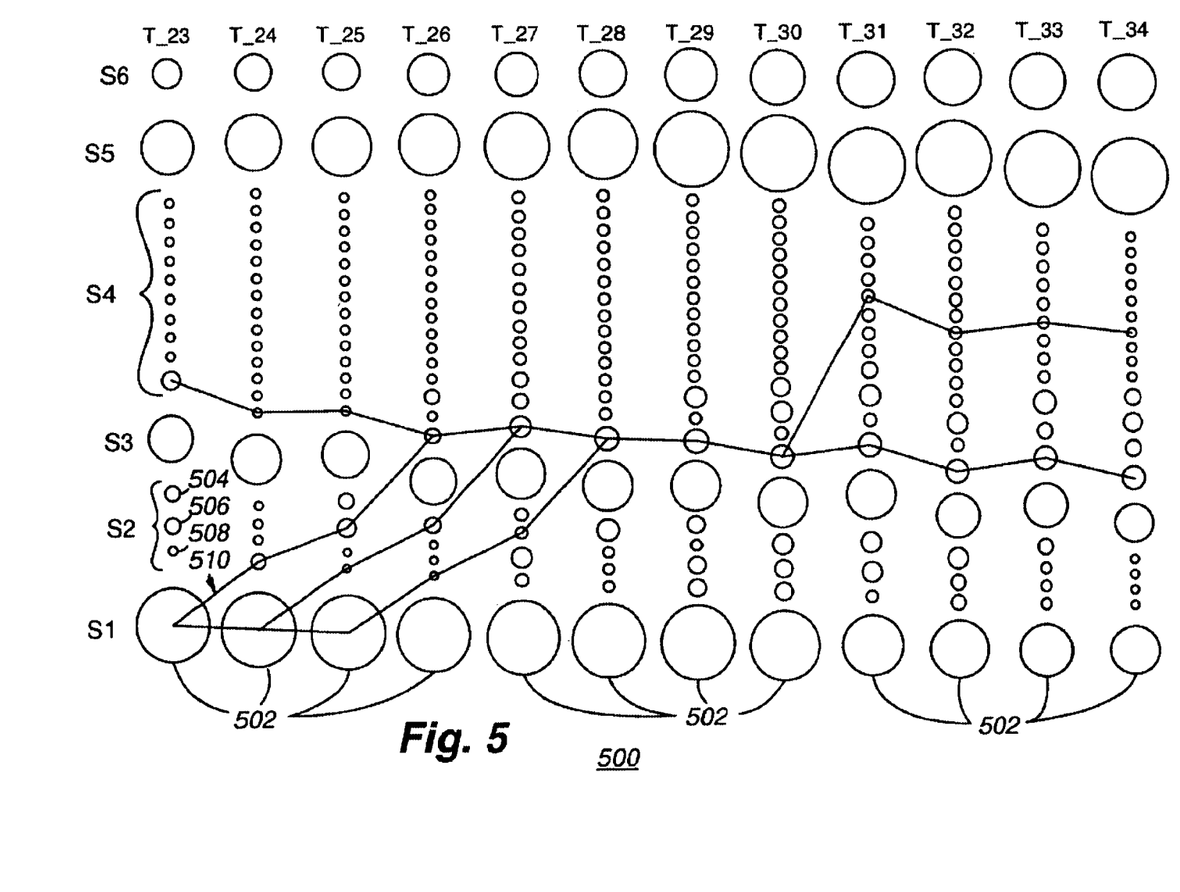
FIG. 5 is a conceptual diagram illustrating the display of workflow information in accordance with the principles of the present invention.

In the illustrative embodiment of FIG. 5 the display 112 provides a view 500 that may be used, for example, in inspecting call flow, but which separates call flow information from the underlying programmed call routing. Columns of circular glyphs 502 represent the number of calls in different states at different times. That is, each column provides a different time "snapshot" and each glyph within a column 502 represents the number of calls in a particular state at a given time. Time is indicated in the display by the alphanumeric strings, $T_{13}$ 23, $T_{13}$ 24 , . . . $T_{13}$ 34 atop each column of glyphs. Each state is indicated by an alphanumeric string, S1, S2 , . . . , S6 to the left of the display. Each call state S1, S2 , . . . S6 corresponds to a workflow location in a call center, such as the states, "Queue 1", "Queue 2", of the call center described in relation to the discussion of FIG. 4. In this illustrative embodiment, the size of each glyph corresponds to the number of calls in a given state at a given time. Other attributes, such as color, patterning, and flashing may be employed to provide further information and drill-down may be employed to display details of individual calls or call states.

A user may employ an input device, such as a mouse 257 to locate a glyph representing a specific call state and time and to break the state down into substates. For example, the illustrated state S2 could represent the number of calls waiting in queue throughout an entire call center and the substates represented by glyphs 504, 506 and 508 may represent the number of calls waiting in queue 1, queue 2, and queue 3, respectively, with the size of each of the glyphs indicating the number of calls in each corresponding queue. In another aspect of the invention, in this view, lines, such as line 510, indicate the flow of work (telephone calls in this example) from one state to another. Additionally, an input device, such as a mouse, may be employed to select a subset of the calls, such as all the calls which pass through a given state at a given time.

Figure 6:
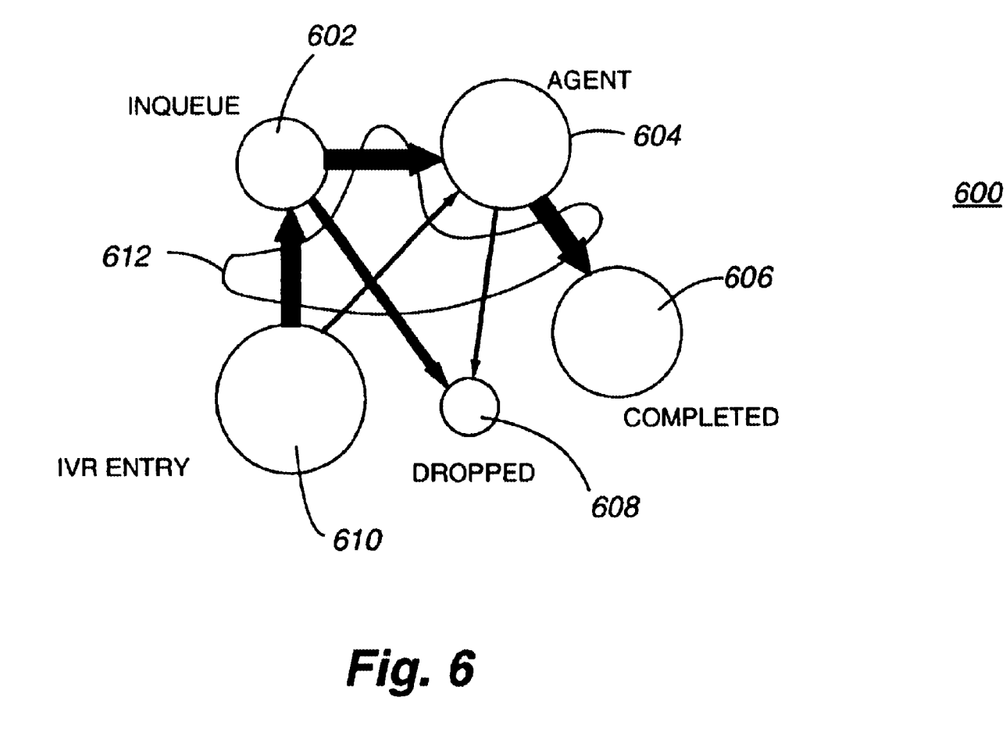
FIG. 6 is a conceptual diagram illustrating the display of workflow information in accordance with the principles of the present invention.

In accordance with the principles of the present invention, the display 112 may also display workflow information in the manner illustrated in the view of FIG. 6. This method of presentation may be thought of as a summary of the view presented in FIG. 5. In this view 600 a circular glyph 602 represents calls in the "IN QUEUE" state, a glyph 604 represents calls in the "AGENT" state, a glyph 606 represents calls in the "COMPLETED" state, a glyph 608 represents calls in the "DROPPED" state, and a glyph 610 represents calls in the "IVR ENTRY" state. Again, the size of each glyph provides an indication of the number of calls in each corresponding state and additional attributes, such as color, patterning, and flashing may be employed to convey more information.

The view of FIG. 6 is particularly useful for the analysis of overall workflow, as opposed to focusing on the treatment of individual work items, such as telephone calls. Such overall analysis may be employed in the determination of staffing requirements and provisioning of equipment in a call center. This display could represent, for example, one column, that is one time sample, of state data from FIG. 5, or it could represent an aggregation of a plurality of columns/time samples. Each of the glyphs 602, 604 , . . . , 610, is connected to other glyphs by "arrows" 612 which indicate the transition of one or more calls from one state to another. In this illustrative example, the thickness of each arrow corresponds to the number of calls making a particular state transition. Other attributes, or alphanumeric information may be employed to convey such information. Each glyph and each arrow may also provide more information through drill-down techniques described in conjunction with the description of previous figures.

In addition to displaying workflow data, a system in accordance with the principles of the present invention may permit a user to manipulate parameters of the system which the display is representing. For example, the view of FIG. 4 may be employed to permit the programming of vectors in a call distribution center or to redefine call treatments in real-time, thereby allowing a supervisor to adjust workflow from an overloaded portion of a work process system to an underutilized portion. Because the view of FIGS. 4 and 5 are capable of displaying individual calls (work items), a user could manipulate the underlying system by interacting with the displayed glyphs to rearrange calls within a queue, for example.

Figure 7:
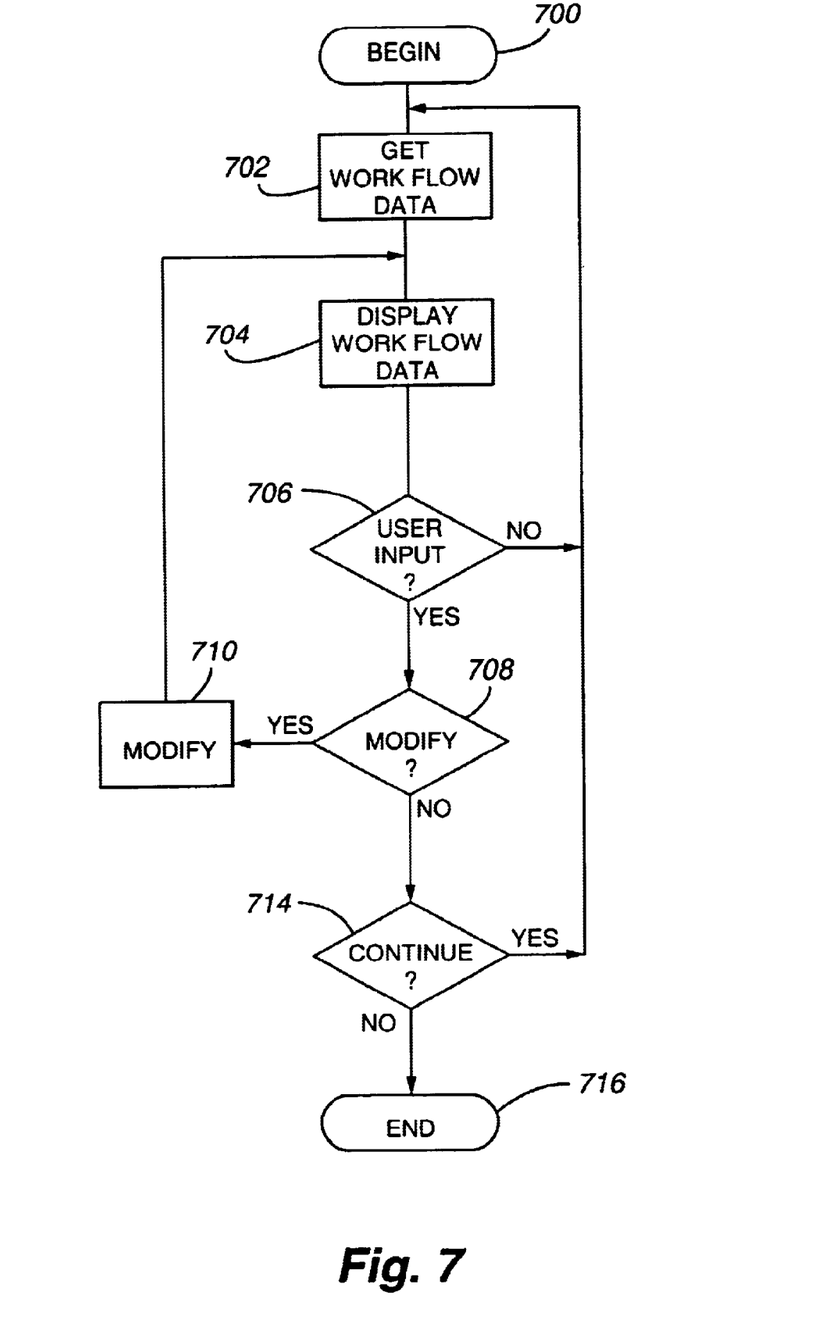
FIG. 7 is a flowchart that depicts the process of displaying workflow information in accordance with the principles of the present invention.

The flowchart of FIG. 7 provides an overview of the process by which workflow information is displayed in accordance with the principles of the present invention. The process begins in step 700 and proceeds from there to step 702 where workflow data is obtained for display. This information may be obtained in a variety of ways. For example, the manager 100 described in conjunction with the description of FIG. 1 may query workflow components, workflow information may automatically be transmitted to the manager 100 at periodic intervals, or the transmission of workflow information may be event driven. However the information may be obtained, once obtained, the information is formatted and displayed diagramatically in step 704 by the controller 110.

The diagramatic display may take the form, for example, of a flowchart that includes static and mobile elements, as described in the discussion related to FIG. 4, it may take the form of rows and columns of glyphs, as described in the discussion related to FIG. 5, it may take the form of glyphs interconnected by arrows which indicate the volume and direction of workflow, as described in the discussion related to FIG. 6, or it may take the form of another diagramatic display. The display may be updated regularly and frequently (in steps not illustrated) before the process proceeds to step 706 where it is determined whether any user input has been received. This input may take the form of "clicking on", or "hovering over" a displayed glyph, and the indication of user input may be event-driven or polled, for example. If it is determined in step 706 that there is no user input, the process returns to step 702 and proceeds from there as previously described.

If user input is detected in step 706, the process proceeds to step 708 where it is determined whether the user input was an indication that the display is to be modified. If the display is to be modified in response to user input, to aggregate substates, to modify static or mobile elements, for example, the process proceeds to step 710 where display information in the display controller 110 is updated accordingly. Additionally, the underlying system may also be modified at this point. A program may be modified to reflect an updated display, for example, if the display is used in a visual programming application, or workflow resources may be reassigned in response to user modification of the display. From step 710 the process proceeds to step 704 and from there as previously described. If the user input does not require an update to the display, the process proceeds to step 714 where it may continue, returning to display and respond to user input as previously described. From step 714 the process may proceed to end in step 716 when a system being monitored shuts down, for example.

A software implementation of the above described embodiment(s) may comprise a series of computer instructions either fixed on a tangible medium, such as a computer readable media, e.g. diskette 142, CD-ROM 147, ROM 115, or fixed disc 152 of FIG. 2, or transmittable to a computer system, via a modem or other interface device, such as communications adapter 190 connected to the network 195 over a medium 191. Medium 191 can be either a tangible medium, including but not limited to, optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate object or processor instructions, or in hybrid implementations which utilize a combination of hardware logic, software logic and/or firmware to achieve the same results. The specific configuration of logic and/or instructions utilized to achieve a particular function, as well as other modifications to the inventive concept are intended to be covered by the appended claims.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. An apparatus comprising:
    a display device, and
    a display controller configured to present workflow information on the display device as a diagrammatic display, wherein the diagrammatic display includes one or more stationary display elements which represent workflow states, wherein the diagrammatic display includes one or more mobile display elements which represent workflow units and, in conjunction with the stationary elements, indicate the number of workflow units in a given workflow state, wherein the workflow information, corresponds to a call distribution center, wherein the workflow units are caller wherein the workflow state is at least one of awaiting a dual tone multi-frequency response from a caller, playing a message to a caller, holding a call in a queue while awaiting servicing, handling of a call by an agent, completion of service of a call, a dropped call, and handling of a call by an IVR, wherein a first stationary display element has a corresponding first workflow state and a second stationary display element has a corresponding second workflow state, and wherein a selected mobile display element is configured to move from the first stationary display clement to the second stationary display element, when a workflow state corresponding to the mobile display element changes from the first to the second workflow state.

2. The apparatus of claim 1 wherein the number of mobile display elements associated with a stationary display element indicates the number of workflow units in the workflow state associated with the stationary display element.

3. The apparatus of claim 1 wherein the size of a mobile display element associated with a stationary display element indicates the number of workflow units in the workflow state associated with the stationary display element.

4. The apparatus of claim 1 wherein stationary elements provide graphical clues to indicate the underlying workflow state which they represent.

5. The apparatus of claim 4 wherein the stationary elements are arranged as a flowchart, interconnected in an order which mimics the interconnectivity of the underlying workflow process represented by the display.

6. The apparatus of claim 5 wherein the display controller is responsive to user input by modifying the display.

7. The apparatus of claim 5 wherein the display is configured to display contact and fulfillment center workflow information.

8. The apparatus of claim 7 wherein one or more stationary display elements represents an agent within a contact and fulfillment center.

9. An apparatus for interactively displaying contact and fulfillment center information comprising:
 a display, and
 a display controller configured to present workflow state on the display device as a diagrammatic display, wherein the diagrammatic display includes one or more stationary display elements, each of which represents a contact and fulfillment center workflow state, and to display one or more mobile elements, each of which represents one or more calls received at the contact and fulfillment center and, in conjunction with the stationary elements, indicate the number of calls received in a given workflow state, wherein the workflow state is at least one of awaiting a dual tone multi-frequency response from a caller, playing a message to a caller, holding a call in a queue while awaiting servicing, handling of a call by an agent, completion of service of a call, a dropped call, and handling of a call by an IVR, wherein a first stationary display element has a corresponding first workflow state and a second stationary display element has a corresponding second workflow state, and wherein a selected mobile display element is configured to move from the first stationary display clement to the second stationary display element, when a workflow state corresponding to the mobile display element changes from the first to the second workflow state.

10. The apparatus of claim 9 wherein the stationary display elements provide graphical indicia of the corresponding contact and fulfillment center state which they represent and the stationary display elements are interconnected on the display to mimic the interconnectivity of the contact and fulfillment center.

11. A method of displaying workflow information as a diagrammatic display comprising the steps of:
 (A) displaying in the diagrammatic display one or more stationary display elements, each of which represents a corresponding workflow state;
 (B) displaying in the diagrammatic display one or more mobile display elements, each of which represents one or more workflow units, and in conjunction with the stationary elements, indicate the number of workflow units in a given workflow state; and
 (C) moving one or more mobile display elements from stationary display element to stationary display element to reflect the movement of workflow units from one state to another in the underlying workflow process, wherein the workflow information, corresponds to a call distribution center, wherein the workflow units are caller wherein the workflow state is at least one of awaiting a dual tone multi-frequency response from a caller, playing a message to a caller, holding a call in a queue while awaiting servicing, handling of a call by an agent, completion of service of a call, a dropped call, and handling of a call by an IVR, wherein a first stationary display element has a corresponding first workflow state and a second stationary display element has a corresponding second workflow state, and wherein a selected mobile display element is configured to move from the first stationary display clement to the second stationary display element, when a workflow state corresponding to the mobile display element changes from the first to the second workflow state.

12. The method of claim 11 further comprising the step of:
 (D) modifying the display in response to user input.

13. The method of claim 12 wherein step (D) comprises the step of:
 (D1) expanding a displayed state into a plurality of substrates.

14. The method of claim 13 wherein step (D) comprises the step of
 (D2) aggregating underlying workflow data in a user selected display element.

15. The method of claim 11 further comprising the step of displaying path information which indicates the path one or more workflow units follow during a given time in traveling from workflow state to workflow state.

16. A computer program product for use with an interactive display system capable of receiving input signals from an input device, the computer program product comprising a computer usable medium having computer readable code thereon comprising:
 display code for displaying workflow information on a display as one or more stationary display elements, and
 display code for displaying workflow information as one or more mobile display elements, wherein the display includes one or more stationary display elements which represent workflow states and wherein the display includes one or more mobile display elements which represent workflow units and, in conjunction with the stationary elements, indicate the number of workflow units in a given workflow state, wherein the workflow information, corresponds to a call distribution center, wherein the workflow units are caller wherein the workflow state is at least one of awaiting a dual tone multi-frequency response from a caller, playing a message to a caller, holding a call in a queue while awaiting servicing, handling of a call by an agent, completion of service of a call, a dropped call, and handling of a call by an IVR, wherein a first stationary display element has a corresponding first workflow state and a second stationary display element has a corresponding second workflow state, and wherein a selected mobile display element is configured to move from the first stationary display clement to the second stationary display element, when a workflow state corresponding to the mobile display element changes from the first to the second workflow state.

17. The apparatus of claim 1 wherein the stationary display elements are displayed in an array having horizontal and vertical axes and in which the vertical axis represents various workflow states and the horizontal axis represents time.

18. The apparatus of claim 17 wherein each display element is a glyph, the size of each glyph corresponding to the number of workflow elements in a given workflow state at a given time.

\* \* \* \* \*